No. 653,236. Patented July 10, 1900.
J. B. HADAWAY.
STITCH SEPARATING AND SHAPING MACHINE.
(Application filed Jan. 5, 1900.)
(No Model.)
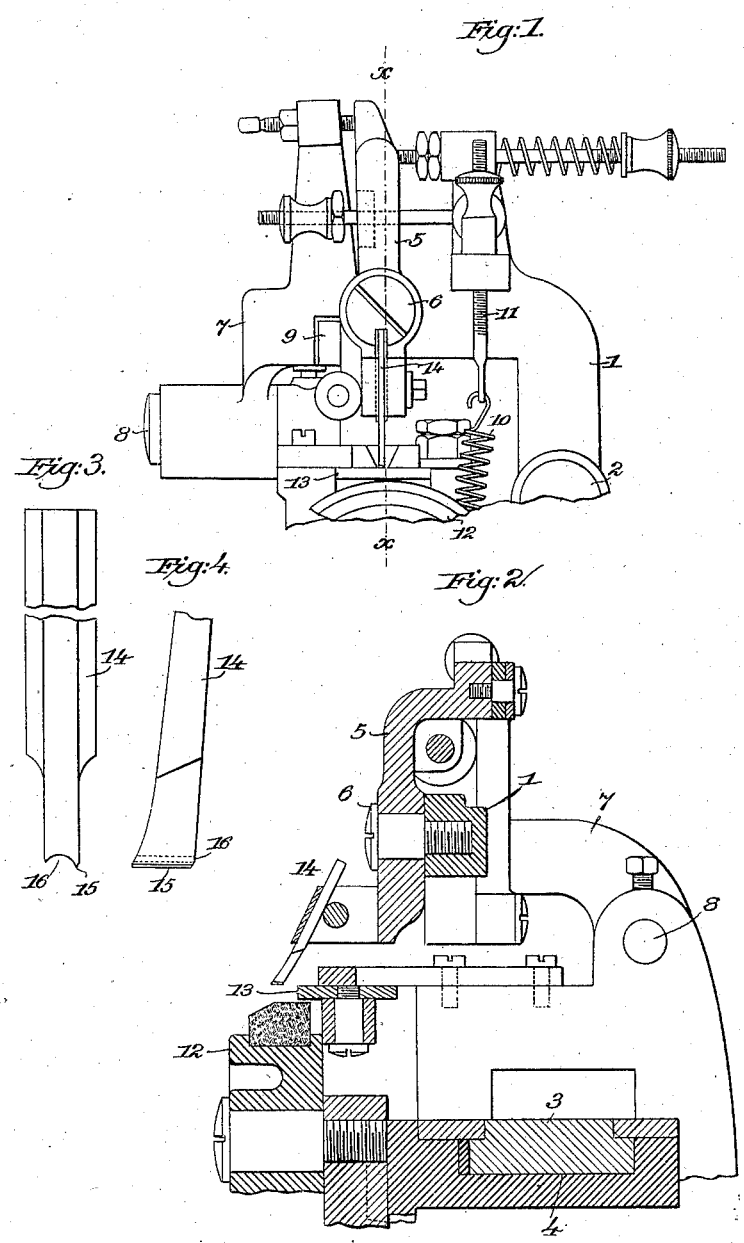

UNITED STATES PATENT OFFICE.

JOHN B. HADAWAY, OF BROCKTON, MASSACHUSETTS.

STITCH SEPARATING AND SHAPING MACHINE.

SPECIFICATION forming part of Letters Patent No. 653,236, dated July 10, 1900.

Application filed January 5, 1900. Serial No. 420. (No model.)

*To all whom it may concern:*

Be it known that I, JOHN B. HADAWAY, a citizen of the United States, residing at Brockton, in the county of Plymouth and State of Massachusetts, have invented certain new and useful Improvements in Stitch Separating and Shaping Machines; and I do hereby declare the following to be a full, clear, and exact description of the invention, such as will enable others skilled in the art to which it appertains to make and use the same.

The present invention relates to stitch-finishing machines, and more particularly to that type of stitch-finishing machine disclosed in reissued Letters Patent of the United States No. 11,538, granted to me on the 12th day of May, 1896. The machine of the said patent comprises a stitch-separating tool arranged to mark or indent the intervals between the stitches, and said tool is actuated by automatic mechanism which locates the working end thereof in the intervals between the stitches of a seam, whether said stitches be of uniform or varying length, and after the working end of the tool has been so located in successive intervals the said tool is positively thrust down to mark or indent the work between the stitches and adjacent to the stitches in line with the intervals therebetween. The automatic locating of the tool of the said machine is controlled solely by the intervals between the stitches, and said tool acts only on the intervals between the stitches or in said intervals and the surface of the work adjacent to and in line with said intervals. It is deemed desirable in some classes of work to act on the crowns of stitches where they appear on the surface of the work, as well as to mark and indent the work in line with the intervals between the stitches, and thus impart to the crowns of the stitches a uniform shape, which is found to add greatly to the appearance of the stitched seam.

One object of the present invention therefore is to provide a stitch-separating machine with a tool which, in addition to the blade which marks or indents the intervals between the stitches, is provided with a stitch-shaping groove to engage and shape the crowns of the stitches, thus at a single operation indenting and marking the work or "separating" the stitches, as it is called, and shaping the crowns of the stitches, imparting thereto a uniform appearance.

A further object of the invention is to so construct the stitch-finishing tool that the separating or marking blade will be assisted in its automatic locating movements by the shaping-groove, the blade entering the intervals between and the groove engaging the crowns of the stitches.

To the above end the present invention consists of a machine comprising a stitch separating and shaping tool provided with a separating-blade and a shaping-groove and means to automatically cause the separating-blade and the shaping-groove to engage, respectively, the intervals between the stitches and the crowns of the stitches, whether said stitches be of uniform or varying length.

The present invention is illustrated in the accompanying drawings, in which it is shown as being embodied in the machine disclosed in the patent hereinbefore mentioned, and wherein—

Figure 1 shows in front elevation portions of the machine with my improved stitch separating and shaping tool in position therein. Fig. 2 shows a section of the machine as shown in Fig. 1, taken on the line $xx$, Fig. 1. Fig. 3 shows in broken front elevation my improved stitch separating and shaping tool enlarged. Fig. 4 shows in side elevation the lower end of said tool.

Similar reference characters will be used to designate corresponding parts throughout the specification and drawings.

In the drawings, 1 indicates a lever fulcrumed at 2 on the slide 3, said slide being arranged to reciprocate in the guideway 4. The tool-stock 5 is pivotally supported by the stud 6 on the lever 1. The lever 7, fulcrumed at 8, engages at its forward end a projection 9 on the lever 1, whereby to positively depress the lever 1 and impart to the stitch separating and shaping tool its downward movement to separate or indent the intervals between the stitches and to shape the crowns of the stitches. The spring 10 is connected by means of a screw-rod 11 to the lever 1 and acts normally to depress said lever and hold the working end of the tool in contact with the line of stitches during the lateral reciprocations of said tool or the locating movements thereof.

12 is a work-support, and 13 an edge gage.

All of the foregoing parts except as will be hereinafter specified may be and preferably are constructed, organized, and operated as corresponding parts in the machine of the patent hereinbefore referred to.

My improved stitch separating and shaping tool 14 is provided at its lower end with a marking-blade 15, which enters the spaces or intervals between the stitches and marks or creases the work at the intervals between the stitches, and upon one side of the blade 15 there is formed a shaping-groove 16, extending from back to front of the lower end of the tool, arranged to engage the crown of a stitch adjacent to the marking-blade 15 and impart to the crowns of the stitches a rounding shape, all as will be clearly understood from an inspection of the drawings.

In the machine of said patent, while the stitch-separating tool is held yieldingly in contact with the line of stitches by means of the spring 10, the slide 3 has imparted thereto lateral reciprocations for the purpose of causing the marking-blade to enter the space between two adjacent stitches, or, as it is called, to automatically locate its point in the intervals between two stitches, and after such tool has been so located the lever 7 is rocked about its fulcrum 8 and, acting upon the projection 9 of the lever 1, forcibly depresses said lever and imparts to the tool its marking or separating movement. In the present machine the blade 15 is automatically located in the intervals between the stitches in a similar manner; but it has been found by experiment that the presence of the shaping-groove materially assists the marking-blade in locating the interval between two adjacent stitches, as said shaping-groove will engage the crown of the stitch to the left of the marking-blade and thus assist in maintaining the working end of the tool fixed after it shall have been located during the subsequent lateral reciprocations of the tool-stock and its carrying-lever, and it will therefore be seen that I have provided an improved machine which not only separates or indents the intervals between the stitches, but also shapes the crowns of the stitches, and one at the same time which will more surely locate the working end of the tool with relation to the stitches.

In the operation of the machine the lever 1, carrying the tool-stock 5, is actuated in all respects substantially as the lever 1 which carries the separating-tool in the machine of the patent hereinbefore referred to, and when the piece of work to be operated upon is properly supported upon the work-support 12 the lateral automatic locating movements imparted to the tool by the reciprocations of the slide 3 will cause said tool to move over the stitches upon which it is lightly held by the spring 10 until the blade 15 engages an interval between two stitches and the groove 16 engages the crown of an adjacent stitch, and whenever the blade 15 engages a space between two stitches and the shaping-groove 16 the crown of the next adjacent stitch a positive downward movement will be imparted to the tool, causing the intervals to be indented and the crown of the stitch to be shaped.

While I have in the accompanying drawings illustrated the shaping-groove 16 as being rounded and have described said groove as imparting a rounded appearance to the crown of a stitch, it will be obvious that the shape of said groove will be determined by the shape which it is desired to impart to the crowns of the stitches—for instance, the shape of the groove may be V-shaped to impart to the crowns of the stitches a corresponding shape.

Having thus described the construction and mode of operation of my machine, I claim as novel and desire to secure by Letters Patent of the United States—

In a machine for separating and shaping stitches, the combination with a work-support, of a stitch separating and shaping tool provided with a separating-blade and a shaping-groove located at one side of and above said blade, and means for automatically locating the separating-blade in the intervals between the stitches and the shaping-groove on the crowns of the stitches whether said stitches be of uniform or varying length, substantially as described.

In testimony whereof I affix my signature in presence of two witnesses.

JOHN B. HADAWAY.

Witnesses:
T. HART ANDERSON,
B. E. WHITE.